Jan. 19, 1943.   F. L. RE QUA   2,308,716
FILTER AND PROCESS OF FILTRATION
Filed Oct. 21, 1939

INVENTOR
FREDERICK L. RE QUA
BY
ATTORNEY

Patented Jan. 19, 1943

2,308,716

UNITED STATES PATENT OFFICE 2,308,716

FILTER AND PROCESS OF FILTRATION

Frederick L. Re Qua, San Francisco, Calif., assignor to Oliver United Filters Incorporated, Oakland, Calif., a corporation of Nevada Application October 21, 1939, Serial No. 300,599

5 Claims. (Cl. 210—201)

This invention relates to a filter and process of filtration, and consists of an improvement to the filter and process disclosed in the Wieneke Patent 2,083,887 of June 15, 1937.

As shown in the Wieneke patent, a precoat or layer of diatomaceous earth or other comminuted filtering material is built up on the surface of the drum of a continuous rotary drum filter, and in order continuously to present a fresh filtering surface to the material being filtered, a knife movably mounted adjacent the face of the drum is continuously advanced into the precoat so as to cut off the outer layer of the precoat as well as the cake which has been deposited thereon during the process of filtration. Due to the cost of the material forming the precoat and the loss of time entailed in from time to time building up the precoat, it has been deemed essential to make the cut not more than several thousandths of an inch deep.

In observing the operation of a filter of this character, it has come to my attention that the precoat is somewhat resilient and that the continuously advancing knife, instead of immediately cutting through the surface of the precoat, slightly compresses it, thereby permitting it to pass under the knife with the consequent formation of waves or undulations. Compression of the precoat is obviously undesirable, for it tends to decrease the size of its interstices. In passing under the knife not only is the precoat compacted, but it is subjected to a burnishing action which forces the small solid particles deposited on the precoat as a result of filtration into the pores of the precoat, thereby further decreasing its efficiency. With continuous advance of the knife toward the drum, the pressure between the knife edge and the surface of the precoat increases, until finally the strength of the latter is exceeded and the knife edge penetrates beneath the surface, thus abruptly initiating a deeper cut than intended or desired. This cut will generally continue for one revolution of the drum, after which the burnishing action described above recommences and may last for several revolutions before the cycle is completed and another abrupt cut commences.

The object of this invention is the provision of a filter and process of operation wherein the knife of a precoat filter is made to advance periodically into the precoat in rapid and definite increments of such nature that the knife as a result of each incremental advance immediately cuts into the precoat without permitting the approaching surface of the precoat to pass under the edge of the knife and without the formation of a compression wave in the precoat material.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing.

Figure 1:
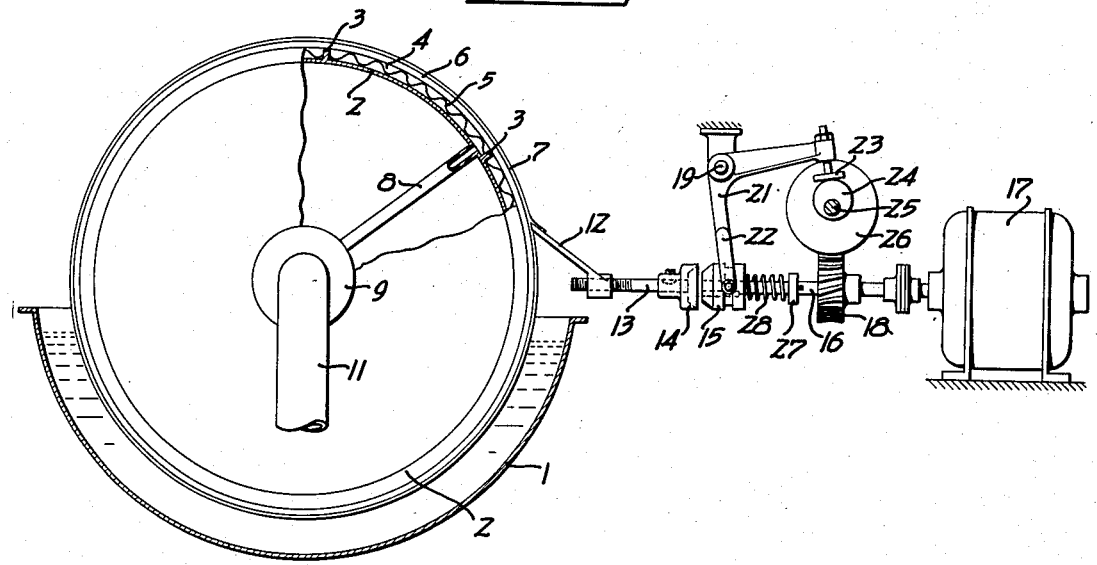
Figure 1 is a diagrammatic illustration of a rotary drum precoat filter embodying the objects of my invention.
Figure 2:
Figure 2 is a magnified detail of the layer of precoat material in which the knife has been advanced in a definite and rapid increment.

As shown in Figure 1, the objects of my invention have been embodied in a filter of the continuous rotary drum type comprising a tank 1 in which is rotatably mounted a filter drum 2 defined by spaced longitudinally extending division strips 3. Carried on the surface of the drum are filtrate compartments 4 adapted to receive spacing or drainage screens 5. Disposed over the entire periphery of the drum and closing the compartments 4 is a cloth or wire screen cover 6, on the outer surface of which is formed a precoat 7 of diatomaceous earth or other finely divided filtering material. Each of the filtrate compartments 4 communicates through a radial pipe 8, an automatic valve 9, and a filtrate outlet 11, with any suitable source of vacuum such as a barometric leg or vacuum pump.

Mounted adjacent the drum 2 and extending across its face is a knife 12 arranged to be advanced or retracted with respect to the surface of the drum by threaded engagement with a longitudinally adjustable screw 13. Secured to the outer end of the screw 13 is a cup 14 adapted to be engaged by a cone 15 journaled on a shaft 16 coaxial with the screw 13. The shaft 16 is driven by a motor 17 and has keyed to it intermediate its ends a gear 18. Carried on a shaft 19 at right angles to the shaft 16 is a bell crank 21, one end of which terminates in a fork 22 having operative engagement with the cone 15. To the other end of the bell crank is adjustably secured a follower 23 arranged to contact a cam 24 carried by a horizontally disposed shaft 25. Keyed to the shaft 25 is a gear 26 arranged to mesh with the gear 18. Fixed to the shaft 16 is a collar 27 and extending between the collar 27 and the rear face of the cone 15 is a compression spring 28 adapted to urge the cone 15 into engagement with the cup 14.

From the above construction it will be noted that once during each revolution of the gear 26 the fork 22 of the bell crank 21 is moved to the left, allowing the spring 28 to force the cone 15 into engagement with the cup 14, whereby the screw 13 is caused to rotate and so to advance the knife 12 into the precoat 7. The total angular rotation of the screw 13, and hence the amount by which the knife 12 is advanced per revolution of the gear 26, is controlled by adjustment of the follower 23 with respect to the bell crank 19.

Figure 3:
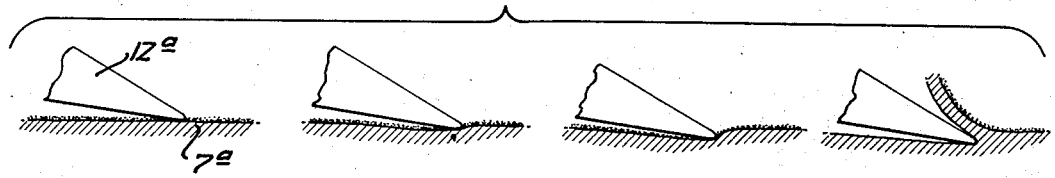
Figure 3 is a magnified detail of the action which takes place in continuously and slowly advancing the knife into the precoat material.

To differentiate the action of the knife advancing into the precoat step by step as above described from the action of the knife continuously advancing into the precoat, this latter action has been illustrated in Figure 3. In this figure the precoat 7a is shown in progressive stages as it passes beneath the tip of the knife 12a. Going from left to right, in its first position the knife 12a is shown as just contacting the precoat 7a. In the next two positions the knife is shown as slightly compressing the precoat with the consequent formation in the precoat of a compression wave, while in the right hand position the knife has advanced sufficiently toward the filter to cut through the surface of the precoat and take off an appreciable cut.

From the nature of the pulp or slurry and the conditions under which it is being filtered, the most effective cycle of operation of the scraper can be readily determined and the mechanism set accordingly. For example, it may be found that to maintain efficient operation it is necessary to advance the scraper only once for every four or five revolutions of the drum. Regardless, however, of the cycle of operation, it is essential that each advance of the scraper be such as will immediately break the surface tension of the precoat and penetrate through its outer skin.

I claim:

1. A filter comprising: a filter cell, a layer of filtering material supported by said cell, a cutting edge mounted adjacent the surface of said layer, means for effecting relative movement of said cutting edge over the surface of said layer, and power actuated means for periodically and progressively advancing said cutting edge into the surface of said layer step by step.

2. A filter cell, a layer of filtering material supported by said cell, a cutting edge mounted adjacent the filtering surface of said layer, means for effecting tangential movement of said cutting edge relative to said filtering surface, and power actuated means for effecting periodic and progressive penetration of said filtering surface by said cutting edge step by step.

3. A filter comprising: a filter cell; a resilient layer of comminuted filtering material supported by said filter cell and forming a filter medium of substantial thickness; a knife extending across the face of said cell immediately adjacent said layer; means for effecting relative movement of said knife over the surface of said layer; and power actuated means for progressively advancing said knife into said layer step by step in increments each of which is sufficient to penetrate immediately the surface of said layer.

4. A filter cell; a substantial layer of comminuted filtering material supported by said cell and forming its filter medium; means for subjecting the interior and exterior of said cell to a differential filtering pressure; a knife extending across the face of said cell immediately adjacent said layer; means for causing said knife to sweep over the face of said layer; and power actuated means for periodically and progressively effecting a rapid relative movement between said knife and said layer so that said knife periodically penetrates the surface of said layer step by step.

5. A process of filtration wherein a filter cell is provided with a filter medium consisting of a substantial layer of comminuted filtering material, comprising: passing liquor to be filtered through said filter medium to arrest its solid content on the outer surface thereof; and from time to time instantaneously advancing the cutting edge of a knife step by step in increments sufficient to penetrate through the outer surface of said filter medium and then shaving off the outer layer of filter medium so penetrated.

FREDERICK L. RE QUA.